B. P. WAGNER.
COVER FOR DUTCH OVENS AND THE LIKE.
APPLICATION FILED JAN. 14, 1920.

1,370,863.

Patented Mar. 8, 1921.

INVENTOR
Bernard P. Wagner
By Fay, Oberlin & Fay
ATTORNEYS.

UNITED STATES PATENT OFFICE.

BERNARD P. WAGNER, OF SIDNEY, OHIO, ASSIGNOR TO THE WAGNER MANUFACTURING COMPANY, OF SIDNEY, OHIO, A CORPORATION OF OHIO.

COVER FOR DUTCH OVENS AND THE LIKE.

1,370,863.   Specification of Letters Patent.   Patented Mar. 8, 1921.

Application filed January 14, 1920. Serial No. 351,425.

*To all whom it may concern:*

Be it known that I, BERNARD P. WAGNER, a citizen of the United States, and a resident of Sidney, county of Shelby, and State of Ohio, have invented a new and useful Improvement in Covers for Dutch Ovens and the like, of which the following is a specification, the principle of the invention being herein explained and the best mode in which I have contemplated applying that principle, so as to distinguish it from other inventions.

The present invention relates to a cover for Dutch ovens, roasting pans and the like. The object of the invention is the provision of a cover which will make a fairly tight joint with the oven or pan and the provision of means on the interior of the cover whereby the steam as condensed, will collect and drip down into the oven or pan, thus basting the meat continuously during the cooking operation. These means for causing the condensate to drip on to the meat are so distributed that the condensate will be evenly distributed over the meat in the oven. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
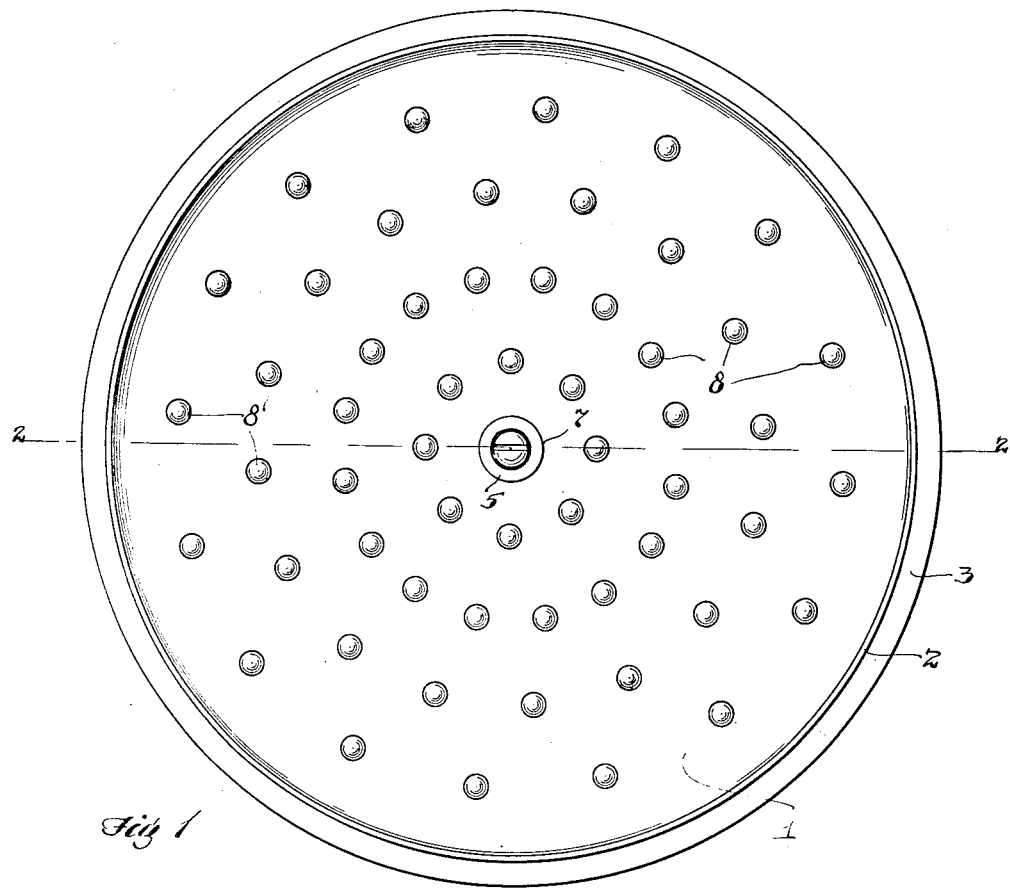
Figure 2:
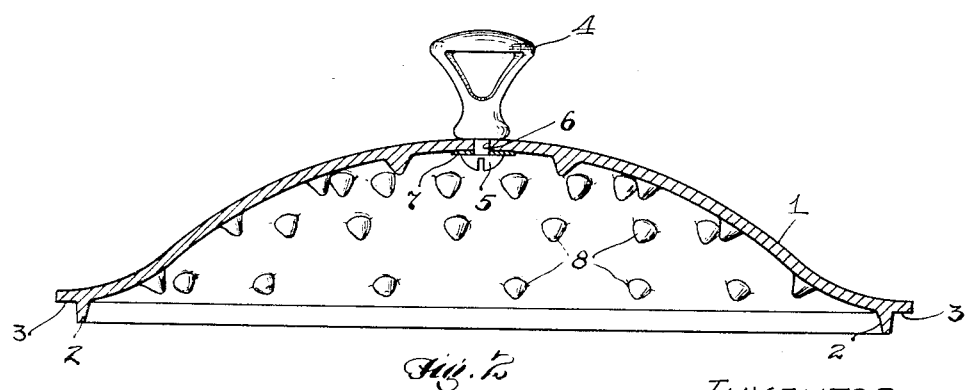

Figure 1 is a bottom plan view of a Dutch oven cover, embodying my invention; and Fig. 2 is a section view of the same taken on a radial line.

The interior surface of the cover 1 is concave or dome shaped, as first shown in Fig. 2, and the cover is provided adjacent the edge with an annular depending flange or rib 2 leaving a shoulder 3 which will rest upon the oven or pan. The flange will fit fairly closely within the pan, so as to make a fairly tight joint. As shown, the cover is provided with a handle 4 mounted approximately centrally, and this handle is held in place by means of a screw 5 which passes through an aperture 6 in the cover and engages in the handle. A washer 7 is preferably placed between the head of the screw and the interior of the cover.

Over the interior surface of the cover are attached a series of nubs 8, preferably cone shaped, which are shown as being formed integrally with the cover, but which may be fastened thereto in any suitable way such as by being welded or by being struck down from the cover. These nubs 8 are distributed fairly uniformly over the surface, the object being to so space the nubs as to have a minimum number of radial lines which would pass between nubs as well as to have each nub receive the condensate from a fairly uniform area.

The nubs are spaced closer together near the center of the cover than out near the edges. As shown, the nubs are arranged on concentric circles, the nubs of each circle being staggered or offset from those of the other circles with respect to radial lines. In the cover shown there are four such circles of nubs, but it is to be understood that the number of nubs per circle and the number of circles will vary according to the size of the cover.

When the covers are not round such as the usual oval roasting pans, the nubs will preferably be arranged on closed curves concentric with the outer closed curve of the pan, and the nubs will be arranged so as to draw condensate from a fairly uniform area, and so as to leave a minimum of radial lines between nubs.

The water of condensation or condensate, usually runs down the cover to the flange 2 and then drips down around the sides of the oven without touching the meat. In the present form the condensate collects on the nubs and drops off onto the meat, thus keeping up a constant basting during the cooking operation. The nubs are slightly closer at the center than elsewhere, as usually the meat does not fill the oven, but is placed nearly at the center thereof. The water, in running down the cover, must take a tortuous path to pass the nubs, and thus the tendency is for the water to collect on the nubs rather than to run to the sides of the cover.

While the basting thus automatically accomplished may not be sufficient, the amount of hand basting necessary is cut to a minimum, and the tendency for the meat to burn or char if not regularly basted by hand is materially reduced and in certain instances entirely removed. A very satisfactory cover is thus obtained and one which increases the efficiency of the oven and which saves work and attention during the cooking operation.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A cover of the character described, having a concave inner surface provided with a plurality of nubs arranged in staggered relation with respect to radial lines.

2. A cover of the character described, having a concave inner surface provided with a plurality of nubs arranged in staggered relation with respect to radial lines, said nubs being spaced nearer together at the center of the cover than adjacent the outer edge.

3. A cover of the character described, having a concave inner surface provided with a plurality of nubs arranged on closed curves concentric with the curve of the cover edge, said nubs being adapted to collect the condensate on the interior of the cover, and to allow the same to drip from the nubs.

4. A cover of the character described, having a concave inner surface provided with a plurality of cone-shaped nubs arranged on closed curves concentric with the curve of the cover edge, the nubs on each such closed curves being staggered in respect to radial lines with the nubs on the other curves.

5. A cover of the character described, having a concave inner surface provided with a plurality of cone-shaped nubs arranged on closed curves concentric with the curve of the cover edge, the nubs on each such closed curves being staggered in respect to radial lines with the nubs on the other curves, the nubs being spaced closer together at the center of the cover than near the outer edge of the same.

6. A cover of the character described, having a concave inner surface provided with a plurality of circumferentially and radially spaced individual-drop forming elements for the vapor condensate of a culinary vessel, said circumferential spacings increasing in size progressively from the cover center to the rim, and said radial spacings between circumferential rows of said drop forming elements being maintained uniform.

Signed by me, this 12 day of January, 1920.

BERNARD P. WAGNER.